(12) United States Patent
Sesek et al.

(10) Patent No.: US 7,535,583 B2
(45) Date of Patent: May 19, 2009

(54) PRINTER-BASED PRE-RIPPING AND CACHING OF NETWORK DOCUMENTS

(75) Inventors: Robert Sesek, Boise, ID (US); Christian Struble, Boise, ID (US); David Slack, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1647 days.

(21) Appl. No.: 10/008,073

(22) Filed: Nov. 5, 2001

(65) Prior Publication Data

US 2003/0086098 A1 May 8, 2003

(51) Int. Cl.
G06F 15/00 (2006.01)
G06K 1/00 (2006.01)
(52) U.S. Cl. ............... 358/1.1; 358/1.15; 358/1.16; 358/1.17; 358/1.18
(58) Field of Classification Search ............... 358/1.13, 358/1.14, 1.15, 1.16, 1.18; 710/62; 711/133; 715/501.1, 205; 709/201, 206; 707/203, 707/10; 400/76, 62; 713/182
See application file for complete search history.

(56) References Cited

U.S. PATENT DOCUMENTS

| 5,615,315 | A * | 3/1997 | Nakajima | 358/1.16 |
|---|---|---|---|---|
| 6,157,930 | A * | 12/2000 | Ballard et al. | 707/203 |
| 6,362,894 | B1 * | 3/2002 | Shima | 358/1.15 |
| 6,430,601 | B1 * | 8/2002 | Eldridge et al. | 709/206 |
| 6,519,048 | B1 * | 2/2003 | Tanaka | 358/1.13 |
| 6,738,841 | B1 * | 5/2004 | Wolff | 710/62 |
| 6,791,702 | B2 * | 9/2004 | Tanaka | 358/1.13 |
| 6,816,944 | B2 * | 11/2004 | Peng | 711/133 |
| 6,876,461 | B2 * | 4/2005 | Usami | 358/1.15 |
| 6,938,202 | B1 * | 8/2005 | Matsubayashi et al. | 715/501.1 |
| 6,945,717 | B2 * | 9/2005 | Hata et al. | 400/76 |
| 7,003,667 | B1 * | 2/2006 | Slick et al. | 713/182 |
| 7,014,374 | B2 * | 3/2006 | Hamaguchi et al. | 400/62 |
| 7,050,192 | B2 * | 5/2006 | Shima | 358/1.18 |
| 7,096,418 | B1 * | 8/2006 | Singhal et al. | 715/501.1 |
| 7,142,318 | B2 * | 11/2006 | Lopez et al. | 358/1.15 |
| 2001/0029521 | A1 * | 10/2001 | Matsuda et al. | 709/201 |
| 2002/0054324 | A1 * | 5/2002 | Okada et al. | 358/1.15 |
| 2002/0080391 | A1 * | 6/2002 | Sugiura et al. | 358/1.15 |
| 2002/0080398 | A1 * | 6/2002 | Matsushima | 358/1.15 |
| 2002/0196468 | A1 * | 12/2002 | Klassen et al. | 358/1.18 |
| 2005/0024682 | A1 * | 2/2005 | Hull et al. | 358/1.18 |
| 2005/0125417 | A1 * | 6/2005 | Elgart | 707/10 |
| 2006/0050313 | A1 * | 3/2006 | Hashimoto et al. | 358/1.15 |

FOREIGN PATENT DOCUMENTS

JP 11134125 5/1999

OTHER PUBLICATIONS

Merz, Thomas. "Generalüberholung", In: iX Jun. 1997, pp. 114-119.
Hewlett-Packard Company "HP LaserJet 4050, 4050T, 4050N, and 4050 TN Printers User's Guide," 1999, cover page, title pages, and pp. xv-xix and 60.

* cited by examiner

Primary Examiner—Edward L Coles
Assistant Examiner—Satwant K Singh (57) ABSTRACT

Printer-based pre-ripping and caching of network documents allows an indication of a network document to be forwarded to a printer prior to a request to print the network document being received. This allows the network document to be converted to a print-ready format, and the converted document to be used for printing if a print request is subsequently received. Additionally, network documents can be cached at the printer (either in print-ready format or not in print-ready format) and the cached documents used for printing.

24 Claims, 7 Drawing Sheets

PRINTER-BASED PRE-RIPPING AND CACHING OF NETWORK DOCUMENTS

TECHNICAL FIELD

This invention relates generally to printing devices, and more particularly to printer-based pre-ripping and caching of network documents.

BACKGROUND

As computer technology has advanced, computers have become increasingly commonplace in homes, businesses, and elsewhere, and have allowed users to perform an increasingly wide variety of tasks. Additionally, as computers have become more commonplace, they have also become more inter-connected. Local area networks have become commonplace in businesses, and are becoming increasingly common in homes. Furthermore, these local networks are becoming increasingly connected to wide area networks (e.g., the Internet), allowing communication among computers throughout the world.

One task that many users often like to perform with their computers is to print out documents retrieved from other sources via the network. For example, users may access server computers to retrieve documents and have those documents printed on a printer that is also coupled to their computer either via a network or directly. However, given the computing power of many modern computers, the documents to be printed can be fairly complex and require a substantial amount of time to be transferred to the printer (via the computer accessing the documents), as well as a substantial amount of time to actually process the documents at the printer in order to print them. Thus, in order to decrease the amount of time that a user has to wait for documents to be printed, it would be beneficial to provide a way to improve the speed of printing these documents.

SUMMARY

Printer-based pre-ripping and caching of network documents is described herein.

In accordance with one aspect, a request to access a network document is received. An indication of the network document for which access is requested is then forwarded to one or more printers prior to receiving a request to print the network document.

In accordance with another aspect, an indication of a network document is received at a printing device, the indication being received independent of a request to print the network document. The indicated network document is retrieved from a document source, converted into a print-ready format, and saved in the print-ready format. Upon receipt of a request to print the network document, the printing device prints the network document using the saved document in print-ready format.

In accordance with another aspect, a cache of network documents is maintained by the printing device. When a request to print a network document is received, a check is made as to whether the network document is present in the cache. If the current version of the network document is present in the cache then the document is obtained from the cache for printing; otherwise, the document is obtained from a remote source for printing.

In accordance with another aspect, a log identifying network documents accessed by one or more client devices is maintained by the printing device. The printing device, upon request, prints the log, generating a hard copy of network documents accessed. The log, and printed hard copy, optionally include a timestamp indicating an approximate time of when the network document was accessed.

DETAILED DESCRIPTION

Printer-based pre-ripping and caching of network documents is described herein. Network documents (or portions thereof) are cached by a printer, allowing the printer faster access to the documents when a request to print one of the documents is received. Additionally, print-ready versions of network documents can be pre-generated by the printer, so that when a print request is subsequently received to print the document, the print-ready format for the document is already available to the printer. Furthermore, a record of network documents accessed can be maintained by the printer, allowing for ready printing of a list of accessed network documents.

Figure 1:
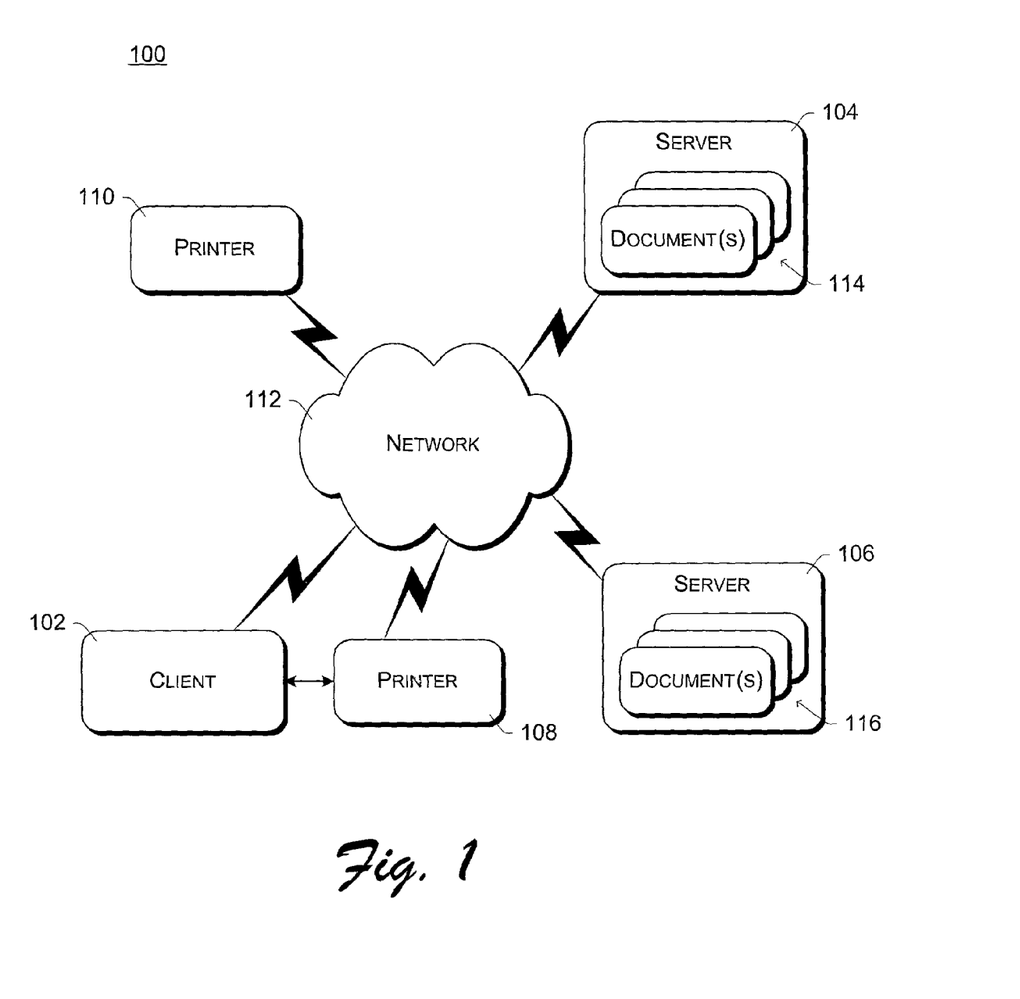
FIG. 1 illustrates an exemplary environment in which document pre-ripping and caching can be employed.

FIG. 1 illustrates an exemplary environment 100 in which document pre-ripping and caching can be employed. A client computing device 102 is coupled to multiple server computing devices 104 and 106 as well as to multiple printers 108 and 110 via a network 112. Network 112 is intended to represent any of a wide variety of conventional network topologies and types (including wired and/or wireless networks), employing any of a wide variety of conventional network protocols (including public and/or proprietary protocols).

Servers 104 and 106 each include one or more network documents 114 and 116, respectively. Servers 104 and 106, and network documents 114 and 116 stored thereon, are accessible to client computing device 102 via network 112. The accessed documents can also be printed to printer 108 and/or printer 110 by client device 102. As illustrated, a printer may be directly coupled to client device 102 (such as printer 108) or alternatively be accessed by device 102 via network 112 (e.g., printer 110). Network documents 114 and 116 each include one or more different types of data or content (e.g., text, video, static images, etc.). Documents 114 and 116 can be stored in any of a variety of different formats, and in one embodiment each document 114 is a single file (which may, in turn, reference one or more other files by name, each of which is to be included as part of the document when printed).

Environment 100 can be used to support one or more of a wide variety of different types of network documents. In one embodiment, environment 100 supports the World Wide Web (or simply the Web), which is a distributed collection of interlinked, user-viewable documents (typically referred to as Web documents or Web pages) that are accessible via the Internet. It should be noted that, although referred to as a "page", a single web page may print out on multiple sheets of paper (or other print media). The Web also refers to the client and server components which provide user access to such documents using standardized Internet protocols. Currently, the primary standard protocol for allowing applications to locate and retrieve Web documents is the HyperText Transport Protocol (HTTP), and the Web pages are encoded using a standard markup language such as the HyperText Markup Language (HTML) or eXtensible Markup Language (XML). Alternatively, other protocols or languages may be used. In one exemplary implementation, each of documents 114 and 116 is a web page, each of servers 104 and 106 is a web server, and client device 102 communicates with servers 104 and 106 via network 112 using HTTP.

During operation client 102 can access one or more documents 114 and 116 (e.g., via a web browser executing on client 102), and then request that the accessed document be printed to printer 108 (or 110). In one implementation, printer 108 (or 110) has a cached copy of the accessed document so that the document need not be transmitted to printer 108 (or 110) in response to the print request. Rather, printer 108 (or 110) can print the accessed document using the cached copy. Alternatively, only selected portions of the accessed document (e.g., static portions, as discussed in more detail below) may be cached on printer 108 (or 110). In another implementation, the accessed document (or selected portions thereof) has already been converted to a print-ready format and stored by printer 108 (or 110). Subsequently, when the print request for the accessed document is received, printer 108 already has a print-ready version of the accessed document and can quickly begin printing the document.

Printers 108 and 110, and the word "printer" as used herein, represent any of a wide variety of printing devices that are capable of generating a hard copy of data. Examples of such printing devices include, but are not limited to, laser printers, inkjet printers, dot matrix printers, thermal printers, facsimile machines, multi-function machines (devices combining the functionality of two or more of a printer, photocopier, facsimile machine, and scanner), etc.

Figure 2:
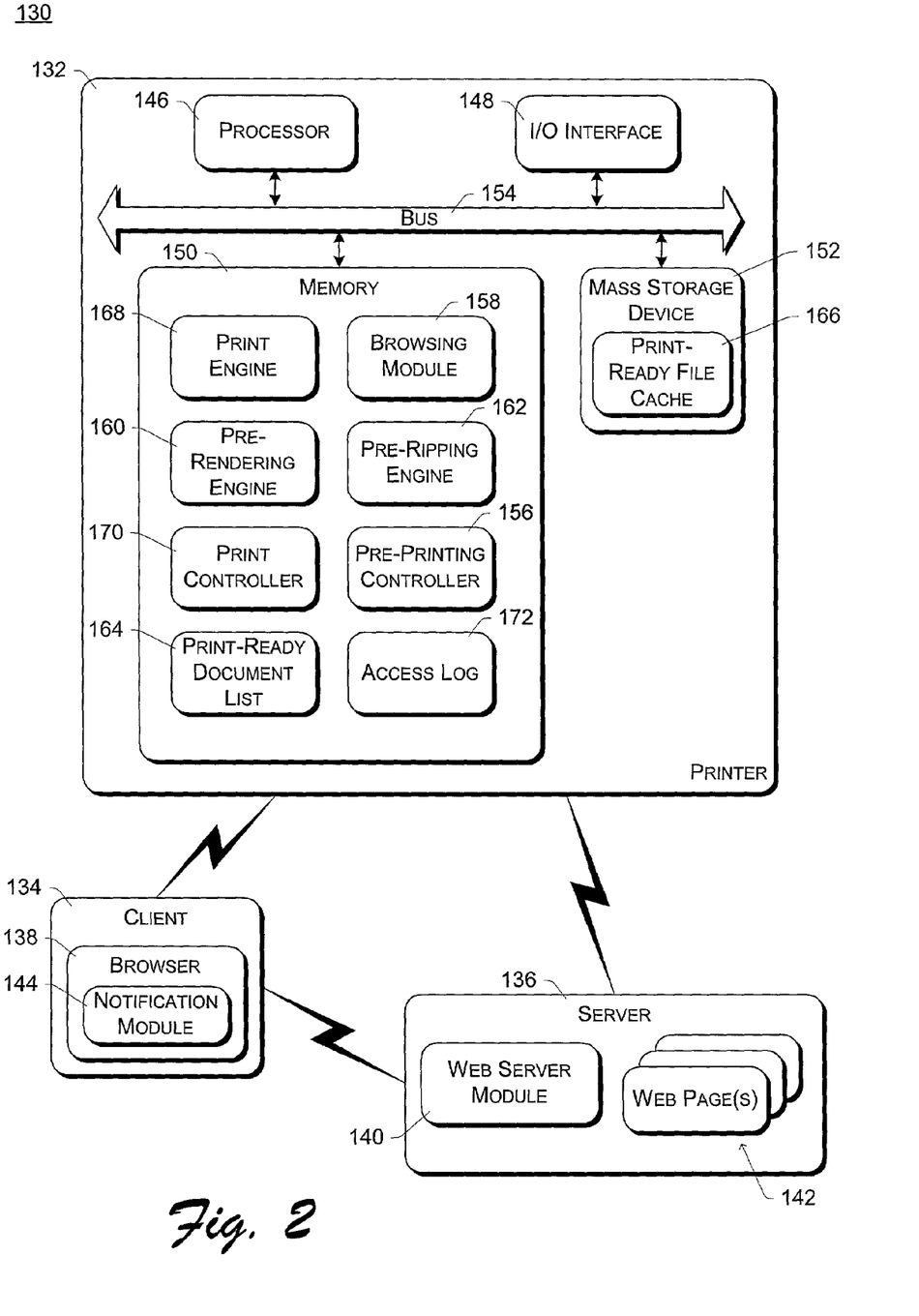
FIG. 2 illustrates an exemplary system in which printer-based pre-ripping and caching of network documents can be performed.

FIG. 2 illustrates an exemplary system 130 in which printer-based pre-ripping and caching of network documents can be performed. System 130 includes a printer 132 (which may be, for example, printer 108 or 110 of FIG. 1), a client device 134 (which may be, for example, client 102 of FIG. 1), and a server device 136 (which may be, for example, server 106 of FIG. 1). FIG. 2 is discussed with reference to the Web and web pages. However, FIG. 2 may operate analogously using other types of networks and other types of network documents and other types of protocols.

During operation, a web browser 138 executing on client device 134 allows a user of device 134 to access server device 136. Server device 136 includes a web server module 140 and one or more web pages 142. The user of client device 134 enters an identifier of one of web pages 142 into web browser 138, in response to which browser 138 accesses web server module 140 to retrieve the identified web page 142 and display (or otherwise present, depending on the content of the web page) the identified web page 142 at client device 134. A particular web page 142 can be identified in a variety of different manners, such as use of a particular Internet address assigned to the web page, use of a Uniform Resource Locator (URL) corresponding to the web page, etc. A particular web page 142 can be explicitly identified by a user (e.g., the user may manually type in the web page's URL or Internet address), or alternatively implicitly identified by a user (e.g., selection of a hyperlink that defines a link to the particular web page 142).

Web browser 138 also includes a notification module 144. When a web page 142 is identified to browser 138, notification module 144 forwards an indication of the web page identification to printer 132. Alternatively, rather than being part of web browser 138, notification module 144 may be external to web browser 138. If external to browser 138, notification module 144 may be informed by browser 138 of the identified web page 142 (e.g., a message sent from browser 138 to module 144), or alternatively notification module 144 may monitor activity in client device 134 to detect the identity of the web page (e.g., monitor communications being sent from browser 138). In one implementation, notification module 144 is implemented as an embedded virtual machine.

In addition to a user entering the indication of the web page, other components or modules of client device 134 may enter an indication of a web page 142 to be accessed as well. For example, a particular application executing on client device 134 may access a web page 142 either via web browser 138 or directly. Notification module 144 may detect, and notify printer 132 of, the identity of such web pages being accessed.

Notification module 144, once it is aware of an identified page, sends an indication of the identified page to printer 132. This indication is sent independently of any request to print the page that may be subsequently submitted by a user to the client device 134 and then sent to printer 132. This notification may identify the web page in the same manner as identified by the user (e.g., by URL), or alternatively in a different format. For example, module 144 may convert the identification of the web page to a different format preferred by printer 132.

In situations where client computing device 134 is coupled to multiple printers (e.g., printers 108 and 110 of FIG. 1), notification module 144 may send the indication of the identified page to a particular one of the multiple printers (e.g., whichever printer is set as a default or preferred printer on client device 134). Alternatively, the indication may be sent to multiple printers (e.g., each printer identified to an operating system on client device 134). For example, in some operating systems (e.g., many of the Windows® operating systems available from Microsoft Corp. of Redmond, Wash.), a user is able to install a set of one or more printers that can be printed to from the computer. In this situation, each of those multiple printers may be sent the indication of the identified page from notification module 144.

It should be noted that notification module 144 sends the indications to printer 132 when a web page 142 is accessed, even though no request to print the accessed web page has been input (by the user or other component or module). Thus, printer 132 may receive multiple indications of web pages for which print requests are never received or are received after a lengthy amount of time.

Printer 132 includes a processor 146, input/output (I/O) interface 148, memory 150, and optional mass storage device 152, coupled together via a bus 154. I/O interface 148 is an interface allowing printer 132 to communicate with client 134 and server 136 via a network. Processor 146 executes instructions stored in memory 150 and optionally mass storage device 152. Memory 150 represents any of a wide variety of volatile and/or nonvolatile memories, such as RAM and/or ROM.

The process carried out by a typical printer in printing a document involves receiving a print request and a document to be printed from the requester. The document is converted to a particular page description language (PDL) supported by the printer (e.g., a particular PCL (Printer Control Language) level, Postscript, etc.), in a process referred to as "rendering". This rendering is typically performed at the computing device submitting the print requested. The rendered document is then converted to a set of hardware-ready bits, in a process referred to as "ripping". This ripping is typically performed at the printer. These hardware-ready bits are supplied directly to the print engine, which controls the application of a print substance (e.g., toner or ink) onto a print medium (e.g., paper, cloth, transparency, etc.) either directly or indirectly (e.g. via a transfer belt) so that the print substance is applied in accordance with the ripped data. This printing process is well-known to those skilled in the art.

Memory 150 stores a pre-printing controller 156, a browsing module 158, a pre-rendering engine 160, a pre-ripping engine 162, a pre-ripped document list 164, a print engine 168, a print controller 170, and an optional access log 172. These system components 156-172 are each a series of one or more instructions executable by processor 146. Indications of accessed web pages are received by pre-printing controller 156 from client 134. Pre-printing controller 156 manages the generation and storage of documents in print-ready format. The print-ready format, as used herein, refers to a format in which the document is saved as hardware-ready bits that can be supplied directly to a print engine and used by the print engine to control the application of print substance to the print medium.

Pre-printing controller 156 maintains a record of print-ready documents in a print-ready document list 164. The print-ready documents are those which have been previously received by printer 132 and converted into a print-ready form. The print-ready documents themselves are stored in a print-ready file cache 166 in mass storage device 152. Alternatively, cache 166 may be stored in memory (e.g., memory 150), or stored on a separate device (e.g. a network drive) remote from printer 132 (not shown).

When pre-printing controller 156 receives an indication of a web page being accessed from client 134, it communicates the indication to browsing module 158 which retrieves the web page. This may also involve retrieving files form other sources (e.g., image files referenced in the web page). Thus, when a web page is being accessed by client device 134, printer 132 accesses that web page as well. In one implementation, browsing module 158 is an embedded web server.

The web page data is received by browsing module 158 and stored in memory 150. Some of the data received as part of a web page may include a timestamp indicating the last time the web page was modified (the timestamp may be part of the page that is displayed by a browser when displaying the page, or alternatively included in control information that is not displayed). Controller 156 compares the web page to print-ready document list 164 to determine whether a print-ready version of this web page is already stored in cache 166. This comparison can be performed in a variety of different manners, and in one implementation list 164 includes, for each file in cache 166, the URL of the web page corresponding to the file. The URL received from client 134 can then be compared to the URLs in list 164, and if the received URL exists in list 164 then a print-ready version of the document is already in cache 166. Alternatively, the determination of whether a print-ready version of a web page is already stored in cache 166 may be performed after the indication of the web page is received from client 134, but prior to retrieval of the web page from server 136 by browsing module 158. However, even if the web page does already exist in cache 166, at least a portion of the web page is still retrieved from server 136 so that the timestamps can be compared, as discussed below.

If the URL received from client 134 does exist in list 164, then a check is made as to whether the web page received from server 136 has been modified since the print-ready version of the web page was saved in cache 166. This check can be performed in a variety of different manners, and in one implementation list 164 includes, for each file in cache 166, a timestamp of when the file was last modified (or alternatively, a timestamp of when the file was saved to cache 166). The timestamp on the web page received from server 136 can thus be compared to the timestamp in list 164, and a determination made that the web page has been modified since the print-ready version was saved in cache 166 if the timestamp received from server 136 is later than the timestamp in list 164.

If the web page has been modified since the print-ready version was saved in cache 166 (so the print-ready version in cache 166 is outdated), or if no print-ready version of the web page is saved in cache 166, then pre-printing controller 156 proceeds to generate a print-ready file corresponding to the web page received from server 136. If the print-ready file generated by controller 156 is a more recent version of a print-ready file already stored in cache 166, then the previous print-ready file is removed from cache 166 and the new print-ready file added to cache 166.

If a new print-ready file is to be generated, then pre-printing controller 156 makes the web page data available to pre-rendering engine 160. Pre-rendering engine 160 converts the web page data into a language used by printer 132 (e.g., PCL, PostScript, etc.). The web page, represented in this pre-rendered language, is then made available to pre-ripping engine 162. Pre-ripping engine 162 converts the pre-rendered language data into hardware ready bits, which in turn are made available to controller 156 for storage in cache 166. Alternatively, in some implementations pre-ripping engine 162 is able to process web pages directly into print-ready bits, and in such implementations printer 132 need not include pre-rendering engine 160.

Pre-printing controller 156 receives the hardware-ready bits generated by pre-ripping engine 162 and stores the hardware-ready bits as a file in print-ready file cache 166. Controller 156 also stores an indication of the file in print-ready document list (e.g., an indication of where the file is located in cache 166 and/or a name/unique identifier for the file), as well as a timestamp for the file (e.g., when the web page 142 corresponding to the file was last modified, or when the file was stored in cache 166), and an identification of the web page 142 (e.g., the URL of the web page).

By generating a print-ready file for a web page 142, printer 132 can more quickly print a document when a print request is received to print the web page, as the rendering and ripping processes have already been performed. A request to print a web page from client device 134 received at printer 132 includes a timestamp (originally received by client 134 from the web page source) corresponding to the web page 142 for which printing is requested (indicating when the web page was last modified). Print controller 170 checks print-ready document list 164 to determine whether a print-ready file corresponding to the web page exists in cache 166, and if so, whether the timestamp received as part of the print request is later than the timestamp stored in list 164 for the print-ready document. If a print-ready file does exist in cache 166, and the timestamp received as part of the print request is not later than the timestamp stored in list 164 for the print-ready file, then print controller 170 retrieves the print-ready file from cache 166 and makes the file available to print engine 168 for printing. If a print-ready file does not exist, or if the timestamp received as part of the print request is later than the timestamp in list 164 (indicating that the print-ready version of the web page is outdated—that is, it has been modified since the print-ready file was generated for the web page), then print controller 170 manages the rendering and ripping of the data received as part of the print request rather than using the print-ready file in cache 166.

In situations where there is no indication for a web page as to when the web page was last modified (e.g., the web page has no timestamp), then the web page is not pre-ripped and stored in cache 166. Alternatively, the web page may still be pre-ripped and stored in cache 166, and other mechanisms used to determine if the cached version is the most recent version. For example, cache 166 may store a non-ripped version of the web page as well as a pre-ripped version. Subsequently, when a request to print the web page is received, the data received as part of the print request is compared (e.g., byte by byte) to determine whether it is the same as (e.g., identical to) the cached non-ripped version. If the two are the same, then the cached ripped version can be used for printing. If the two are not the same, then print controller 170 manages the rendering and ripping of the data received as part of the print request rather than using the print-ready file in cache 166.

The pre-rendering and pre-ripping modules 160 and 162 used for the pre-rendering process may be separate modules than the rendering and ripping modules used for normal printing (e.g., when printing without using a print-ready file from cache 166), or alternatively may be the same modules.

Access log 172 is also optionally maintained in memory 150. Upon receiving an indication of a web page being accessed, controller 156 adds the indication (e.g., URL) to access log 172, and optionally adds a timestamp (e.g., date and time) of when the notification was received by printer 132. Various other information regarding the accessed web pages may also be stored in access log 172, such as which web pages were printed, what format the pages are in (e.g., HTML or some other format), and so forth. A "print log" request can then be input by a user of client 134 (e.g., via browser 138), which is communicated to printer 132. In response, printer 132 prints out the content of access log 172. Thus, the user of client device 134 can readily generate a hard copy record of the web pages that he or she accessed from device 134 as well as a list of those accessed and printed.

Controller 156 optionally records an identity of the client device from which the notification is received. Notifications sent from client device 134 to printer 132 typically include an identification of device 134 as the source of the notification (e.g., the network address of the client device). Controller 156 can then maintain separate portions of log 172 for different client devices 134 (thus allowing different records to be printed in response to a print log request, based on the identification of the client device that supplies the print log request). Alternatively, notifications sent from client device 134 to printer 132 may also include an indication of the user that is currently logged in to client device 134, and controller 156 can maintain separate portions of log 172 for different users. Thus, regardless of which one or more client devices a user is using, he or she can have a record of the web pages that he or she accessed from those client device(s) printed out by printer 132 as well as a list of those pages accessed and printed.

Pre-printing controller 156 may be configured to operate at various times. In one implementation, controller 156 is configured to run (and thus have print-ready files generated) during times when printer 132 is idle (e.g., the times that printer 132 is not in the process of printing a document). Thus, the speed with which web pages are printed for which there is no print-ready file should not be adversely affected enough to be noticeable to a user, yet there should be user-noticeable improvement in the speed with which web pages are printed for which there is a print-ready file. Alternatively, both the print-ready file generation process and the process of printing a document may be performed concurrently (e.g., by multitasking).

In implementations where controller 156 runs during the time printer 132 is idle, access log 172 could be used as a queue 172 of web pages and/or web page indications that is generated. An indication of a web page access request that is received by printer 132 while printer 132 is printing another document is saved in queue 172. Subsequently, when printer 132 is idle, preprinting controller 156 takes a web page indication from queue 172 and makes the indication available to browsing module 158 to retrieve the identified web page. If a print request is received by printer 132 while a print-ready file is being generated for cache 166, the generation of the print-ready file is temporarily halted until the printing process is completed. Controller 156 may take web page indications from queue 172 in a variety of different orders, such as first-in first-out (FIFO), last-in first-out (LIFO), randomly, etc. Controller 156 may also monitor the print requests received by printer 132 and if a request to print a web page that is currently queued in queue 172 is received, controller 156 may remove that web page from queue 172 for immediate processing and printing (or alternatively reposition it in the queue).

Cache 166 may be of limited space and situations may thus arise when additional print-ready documents are to be stored in cache 166 but there is insufficient space in cache 166 to accommodate both the previously cached pages and the new pages to be cached. Space can be freed in cache 166 by removing one or more print-ready documents from cache 166. Any of a wide variety of criteria can be used in determining which document(s) to remove from cache 166, such as the age of the document (e.g., remove documents that have been in the cache the longest), the last time the document was printed (e.g., remove documents that have not been printed recently), size (e.g., remove very large or very small documents first), etc.

Web pages may be static or dynamic. Static web pages are web pages that have fixed data that does not change based on the user or device viewing the web page nor on the inputs to the web page. Dynamic web pages, on the other hand, are web pages that can change based on the user or device viewing the web page, or on the user's inputs to the web page (e.g., a user's entry of data on forms, the position of the user's cursor on the web page, links to data that is being updated continuously (e.g. stock prices, weather forecasts, etc.), etc.). Dynamic web pages can be created in any of a variety of different manners, such as using Java Server Pages or Active Server Pages. Additional information regarding Java Server Pages is available from Sun Microsystems Inc. of Palo Alto, Calif., and additional information regarding Active Server Pages is available from Microsoft Corporation of Redmond, Wash. Although referred to as dynamic web pages, a dynamic web page may include one or more static portions (e.g., certain blocks of text or images, frames or backgrounds, that do not change, but other areas (such as form fields for data entry) that do change).

Additional care should be taken in pre-generating print-ready versions of dynamic web pages because, due to the nature of dynamic web pages, the content of the web page as viewed by the user of the client device may have changed since the indication of the web page was communicated to the printer. In one implementation, dynamic web pages are filtered and print-ready versions of dynamic web pages are not generated. This filtering can be performed at the client computing device so that the indication of the web page is not communicated to the printer, or alternatively at the printer so that any indication of a dynamic web page received at the printer is simply ignored by the printer. Dynamic web pages can be identified in a variety of different manners, such as the format of the URL (e.g., a URL including ".jsp" indicates a Java Server Page and a URL including ".asp" indicates an Active Server Page).

Alternatively, the pre-printing may be applied to only the static portions of a web page, so that the print-ready file only includes the static portion. Subsequently, when a print request is received from the client computing device, the dynamic portions are rendered and ripped, and then combined with the print-ready version of the static portions for printing. Based on the manner in which the dynamic page is written, the dynamic and static portions of the page can be readily identified (e.g., based on tags in the document describing how the document is to be displayed). For example, a dynamic web-page may be a form with multiple fields to be filled in by the user. The blank form can be pre-rendered and pre-ripped and saved as a print-ready file. Subsequently, when the print request is received, the user-entered data from the form is rendered and ripped, and then combined with the print-ready data prior to printing. This pre-ripped static data and the newly ripped user-entered data can be combined in a variety of different manners. For example, if printing in black and white (monochrome), the ripped user-entered data can be overlaid on the bits of the static pre-ripped data, and a bitwise logical AND operation performed to determine the value of each bit. By way of another example, if printing in color or black and white with shading (monochrome with gray scaling), the ripped user-entered data can be overlaid on the bits of the static pre-ripped data, with the values from the ripped user-entered data replacing any values from the static pre-ripped data.

FIG. 2 illustrates the pre-printing process being performed by modules in printer 132. Alternatively, printer 132 may operate in conjunction with a print server, such as a dedicated print server device or a print server application executing on a server computer. If a print server is used, then the pre-printing process described herein can be performed at the print server rather than at the printer itself (e.g., controller 170 and engines 160 and 162 may be implemented at the print server external to the printer 132).

Figure 3:
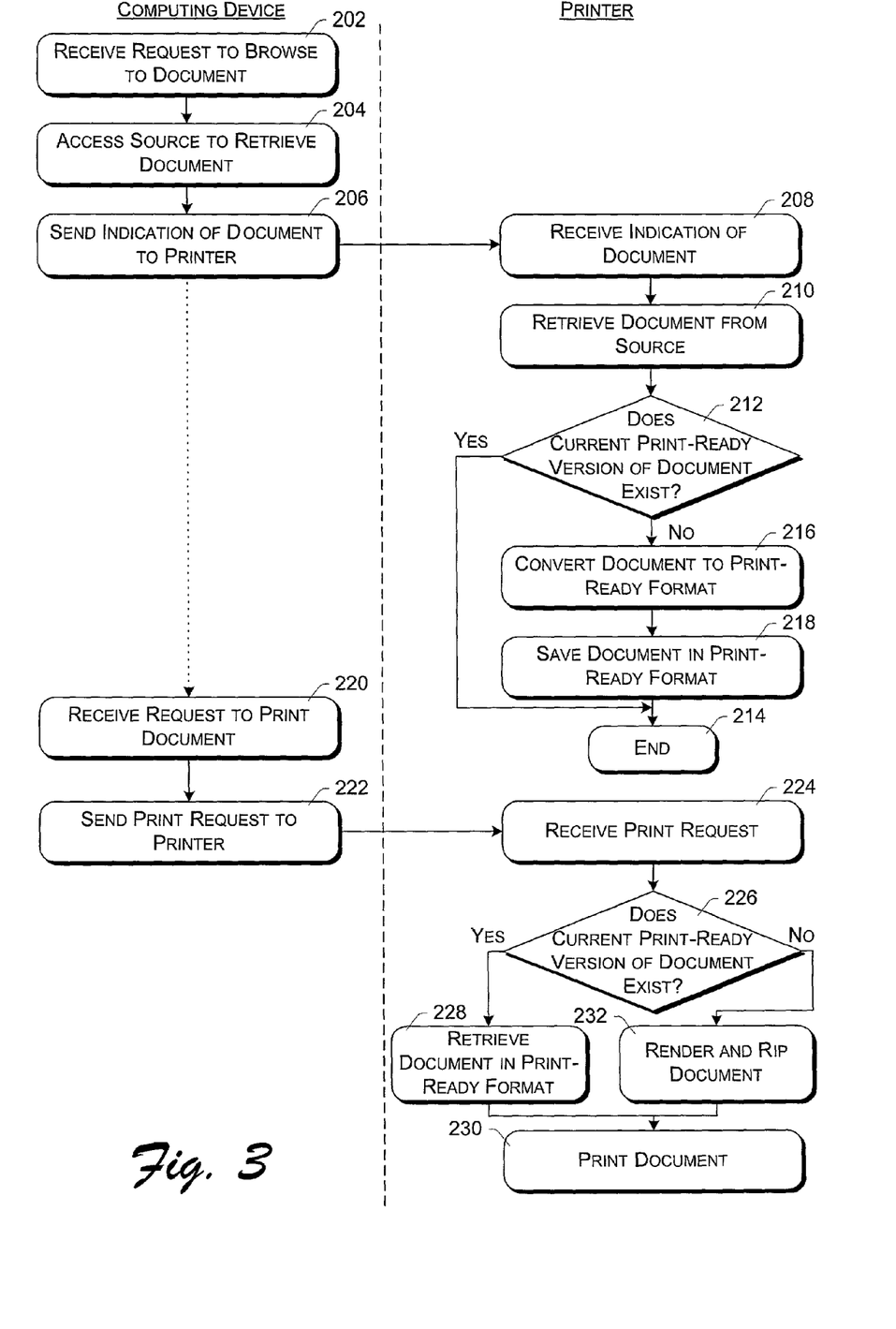
FIG. 3 is a flowchart illustrating an exemplary process for pre-generating print-ready documents.

FIG. 3 is a flowchart illustrating an exemplary process for pre-generating print-ready documents. The process of FIG. 3 is performed by a client computing device and a printing device, such as client 134 and printer 132 of FIG. 2. For ease of explanation, acts performed by the client computing device are illustrated on the left-hand side of FIG. 3, while acts performed by the printing device are illustrated on the right-hand side of FIG. 3.

Initially, a request to browse to a document is received at the client computing device (act 202). The client computing device accesses a source to retrieve the document (act 204). The source of the document may be the server that hosts the document, or alternatively an intermediary (e.g., a data cache between the client and server). In addition to retrieving the document, an indication of the document is sent to the printer (act 206).

The printer receives the indication of the document being accessed by the computing device (act 208), and also retrieves the document from a source (act 210). The source from which the printer retrieves the document may be the same as the source from which the client computing device retrieves the document, or alternatively a different source (e.g., one may retrieve the document from a cache while the other retrieves the document from a server hosting the document, or one may be routed to a different server that hosts the same document (e.g., to avoid overloading the first server)). In some embodiments (such as a direct connect to the printer) the printer may receive the document directly from the computing device.

Once retrieved, the printer checks whether a current print-ready version of the document exists (act 212). If a current print-ready version exists, then the process ends (act 214), as no new print-ready document need be generated. However, if a current print-ready version does not exist (e.g., there is no print-ready version, or the print-ready version that exists is outdated), then the retrieved document is converted to a print-ready format (act 216). The document in print-ready format is then saved (act 218).

Subsequently, and unrelated to the sending of the indication of the document to the printer in act 206, a request to print the document is received at the client computing device (act 220). This print request may be received immediately after the document is loaded to the computing device (e.g., immediately after a web page is displayed to a user of the client computing device), or alternatively at some later time (e.g., hours, days, weeks, etc. after the document is retrieved to the client computing device). Any number (zero or more) of additional documents may have been accessed by the client computing device prior to the print request being received in act 220.

Once received, the print request is sent to the printer (act 222). The print request may include the document to be printed, or alternatively just an indication (e.g., URL) of the document to be printed. The print request is received at the printer (act 224), which checks whether a current print-ready version of the document exists (act 226). If a current print-ready version exists, then the printer retrieves the document in print-ready format (act 228), and prints the document (act 230). However, if a current print-ready version does not exist (e.g., there is no print-ready version or the print-ready version that exists is outdated), then the document to be printed is rendered and ripped (act 232), and printed (act 230). Alternatively, the rendering may be performed by the client computing device rather than the printer. In addition, the ripped version of the document may also be saved by the printer as a print-ready version of the document to be used if subsequent requests to print the document are received.

Alternatively, acts 220 and 222 may be performed by a client computing device other than the device that performed acts 202, 204, and 206. Thus, the document in print-ready form can be used to print, by the printer, regardless of which device initially sent the indication to the printer that caused the printer to generate the print-ready form. Also note that acts 220 and 222 may be performed by a client computing device that does not include a notification module 144 of FIG. 2.

Figure 4:
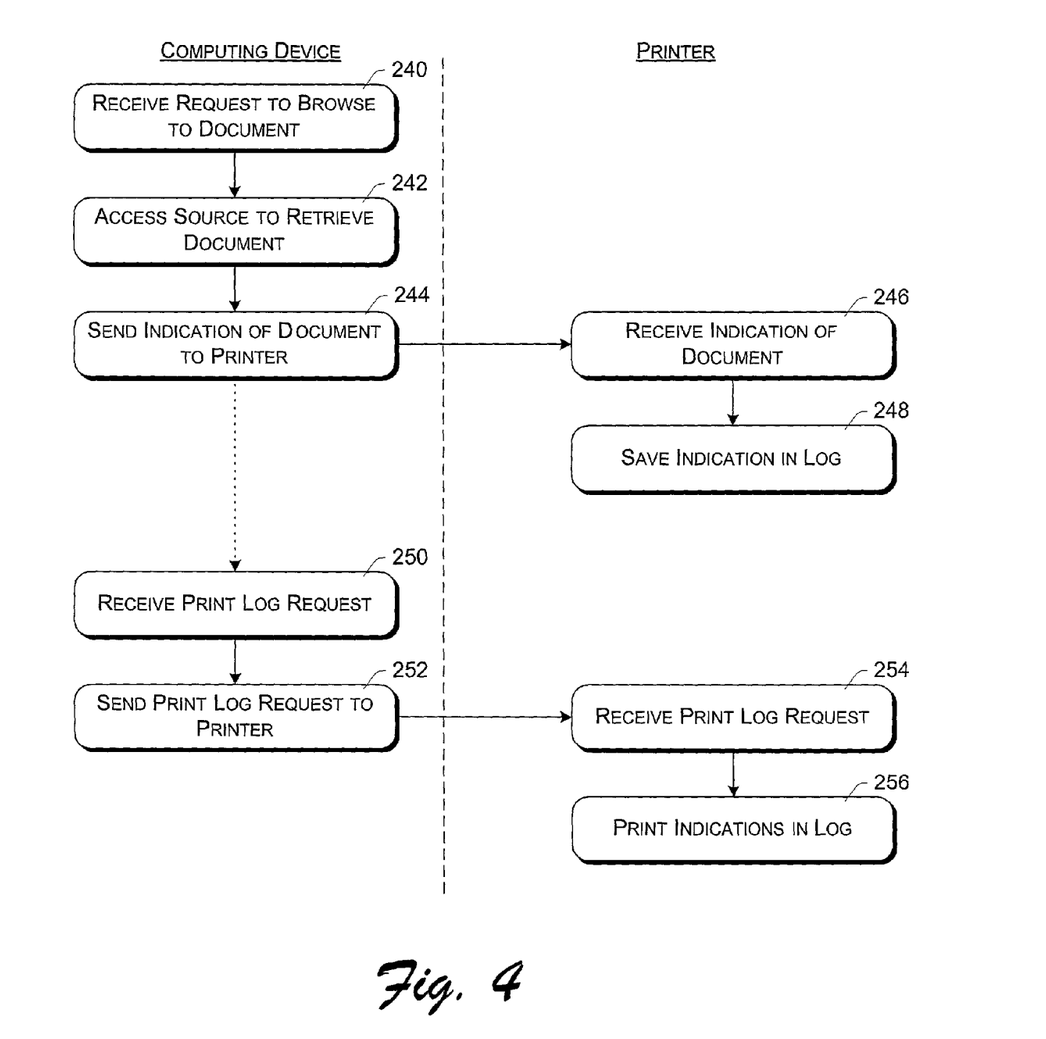
FIG. 4 is a flowchart illustrating an exemplary process for maintaining and printing an access log.

FIG. 4 is a flowchart illustrating an exemplary process for maintaining and printing an access log. The process of FIG. 4 is performed by a client computing device and a printing device, such as client 134 and printer 132 of FIG. 2. For ease of explanation, acts performed by the client computing device are illustrated on the left-hand side of FIG. 4, while acts performed by the printing device are illustrated on the right-hand side of FIG. 4.

Initially, a request to browse to a document is received at the client computing device (act 240). The client computing device accesses a source to retrieve the document (act 242). The source of the document may be the server that hosts the document, or alternatively an intermediary (e.g., a data cache between the client and server). In addition to retrieving the document, an indication of the document (e.g., its URL) is sent to the printer (act 244).

The printer receives the indication of the document being accessed by the computing device (act 246), and saves the indication in a log (act 248). Optionally, in act 248, the printer may also save a timestamp associated with the document indication. Also, in act 248, the printer may save indications on a per-client device basis (e.g., different logs for different client devices), or on a per-user basis (e.g., different logs for different users regardless of which client device they are currently using).

Eventually, a request to print the log is received at the client device (act 250) and a print log request is sent to the printer (act 252). The printer receives the print log request (act 254), and in response to the print log request prints out the network document indications in the log (act 256). This printing may be a printing of all indications in the log, only the indications in the log that were received by the printer from the same client device as sent the print log request, or only the indications in the log that were received by the printer from the same user as the user of the client device at the time the print log request was sent.

Additionally, various filters or search parameters may be used in conjunction with the log maintained by the printer. For example, as part of the print log request the user may request that only indications in the log having timestamps in a certain range be printed (e.g., only those log entries with timestamps in the last hour), or request that only indications in the log including certain characters be printed (e.g., only URLs that include the characters "hp"), etc. The user may only print those indications that were actually printed, or those actually printed by a specific user or set of users for a given time frame, in a specific document format, or any other criteria imposed by the requestor.

Figure 5:
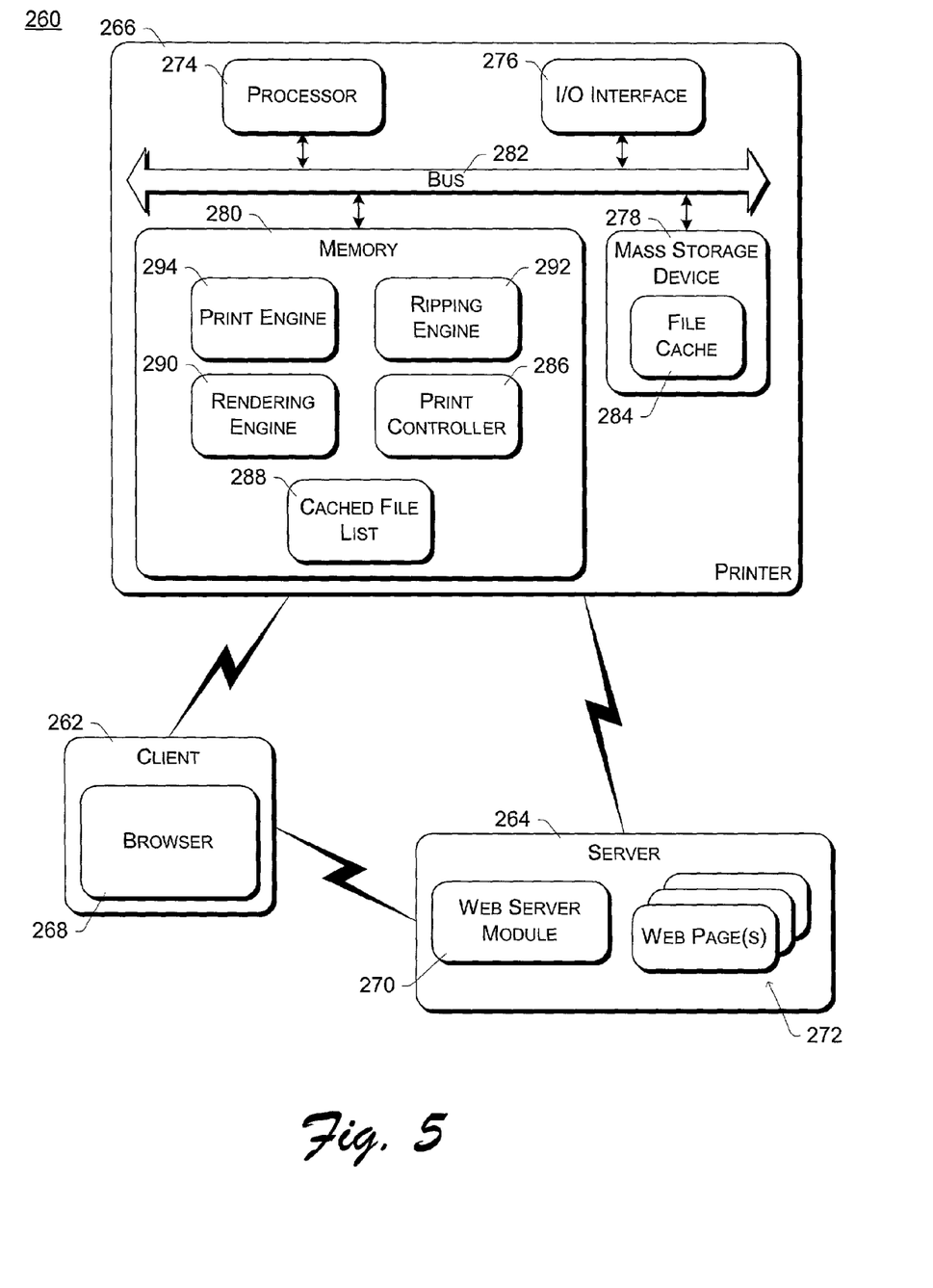
FIG. 5 illustrates another exemplary system in which printer-based caching of network documents can be performed.

FIG. 5 illustrates another exemplary system 260 in which printer-based caching of network documents can be performed. System 260 is similar to system 130 of FIG. 2, however, the pre-printing is not illustrated in system 260. Rather, in system 260, web pages are cached by the printer so that they do not need to be transferred to the printer for printing.

System 260 includes a client computing device 262, server device 264, and a printer 266. Client 262 includes a browser 268, analogous to client 134 and browser 138 of FIG. 2 (but without the notification module 144). Server 264 includes a web server module 270 and one or more web pages 272, analogous to server 136, module 140, and web pages 142 of FIG. 2. Printer 266 includes a processor 274, I/O interface 276, optional mass storage device 278, and memory 280 coupled together via a bus 282, analogous to processor 146, I/O interface 148, mass storage device 152, memory 150, and bus 154 of FIG. 2.

Mass storage device 278 includes a file cache 284 of web pages. Cache 284 includes copies of selected ones of web pages 272 that can be used for printing by printer 266, thereby alleviating the need to wait for the data for the web page that is to be printed to be communicated from client device 262 to printer 266. Which web pages are selected to have copies stored in cache 284 can be determined in a variety of different manners. In one implementation, an administrator (e.g., responsible for client 262 and/or printer 266) determines which web pages are to have copies stored in cache 284 (e.g., based on the administrator's belief of which pages are most likely to be accessed, which pages will take the longest to download from client 262 to printer 266, etc.). Alternatively, a module of memory 280 (e.g., a print controller module) may monitor which web pages are printed most frequently by printer 266 and keep copies of those web pages in cache 284.

Memory 280 includes a print controller 286, a cached file list 288, a rendering engine 290, a ripping engine 292, and a print engine 294. During operation, a print request is received by print controller 286. A check is made as to whether the page for which printing is requested is stored in cache 284 by accessing cached file list 288. Cached file list 288 is a record of the web pages stored in cache 284 (e.g., the URL for the web page, the filename for the web page, the filename and/or pathname for a network document, etc.). If a copy of the page requested for printing does exist in cache 284, then print controller 286 uses the copy from cache 284 for printing. However, if no such copy exists in cache 284, then the data received from client 262 is used for printing.

Regardless of whether the data is received from cache 284 or from client 262, print controller 286 manages rendering engine 290, ripping engine 292, and print engine 294 to print a hard copy of the web pages. Alternatively, cache 284 may store print-ready versions of the web pages (e.g., pre-rendered and pre-ripped), analogous to the discussion above regarding FIGS. 2 and 3.

Additionally, situations can arise where a copy of a web page stored in file cache 284 includes both static and dynamic portions. In such situations, only the static portions are saved in cache 284 and the dynamic portions are received from client 262.

In one embodiment, client 262 is aware of file cache 284 and thus may not communicate web pages to printer 266 which are already in cache 284. For example, browser 268 may send a print request to printer 266, and then wait for an indication from print controller 286 as to whether the data for the web page needs to be sent to printer 266 (based on whether the web page is identified in list 288). In the case of dynamic data, browser 268 may send the dynamic data along with the print request, or alternatively wait for the indication from print controller 286 as to whether only the dynamic data need be sent or whether both the dynamic and static data should be sent.

In another embodiment, client 262 may not be aware of file cache 284 and thus may communicate web pages to printer 266 without concern for whether such pages are included in cache 284. In this embodiment, although client 262 may transmit data for the web pages to printer 266, print controller 286, upon identifying that a copy of the web page is included in cache 284, can simply ignore the data being received from client 262 (or alternatively, ignore only the static data) and begin printing the web page based on the copy in cache 284 even though all the data from client 262 has not yet been received. This allows situations to occur, for example, in which printer 266 is finished printing a web page before client 262 has transferred all of the web page data to printer 266.

Figure 6:
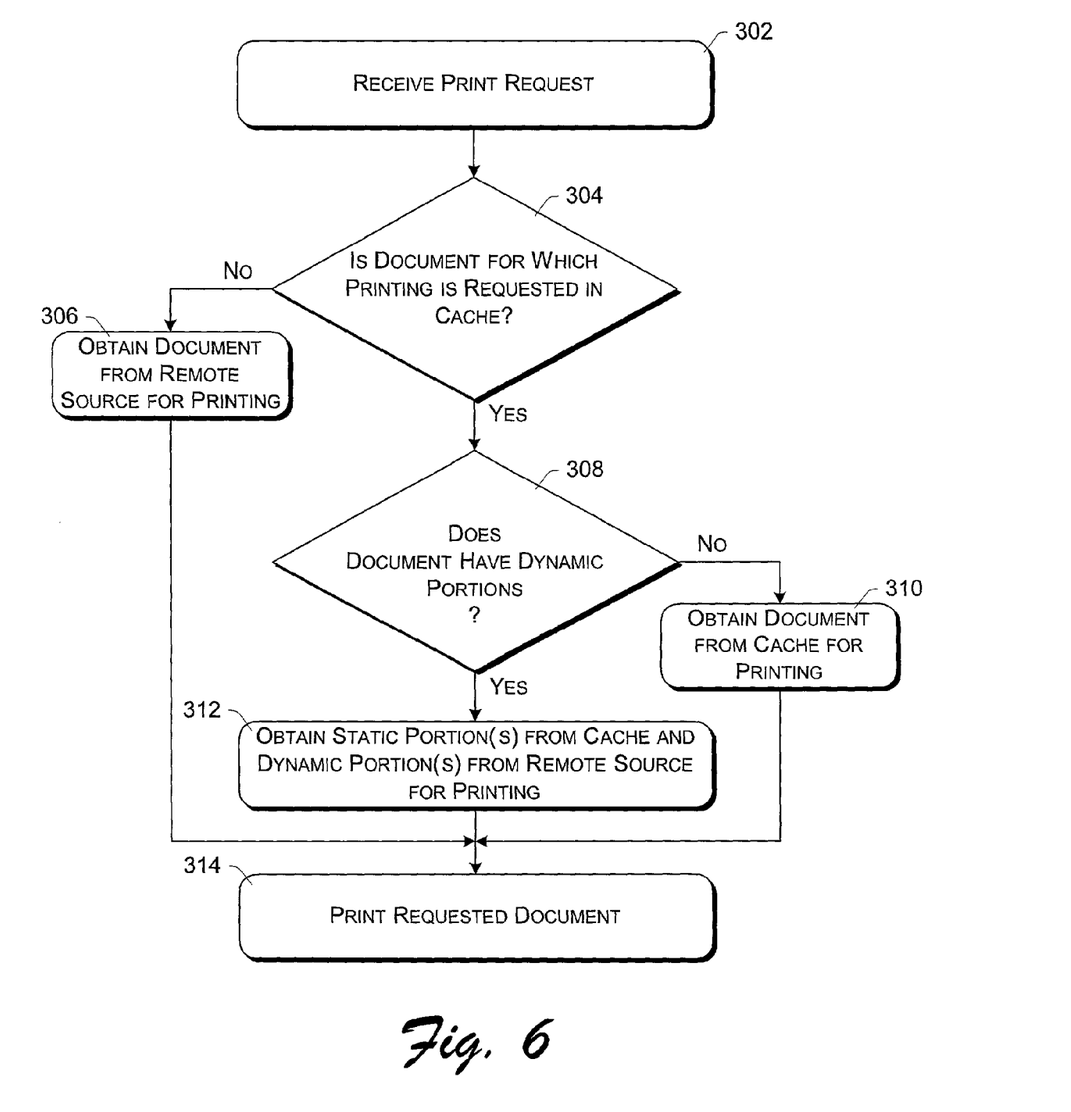
FIG. 6 is a flowchart illustrating an exemplary process for printing cached documents.

FIG. 6 is a flowchart illustrating an exemplary process for printing cached documents. The process of FIG. 6 is performed by a printing device, such as printer 266 of FIG. 5.

Initially, a print request is received (act 302) and the cache checked to determine whether the document for which printing is requested is in the cache (act 304). If the document is not in the cache, then the document is obtained form a remote source (e.g., the client requesting printing of the document) for printing (act 306), and printed (act 314). However, if the document is in the cache, then a check is made as to whether the document has dynamic portions (act 308). This check can be performed in a variety of different manners, such as based on whether the URL indicates a web page written in as a Java Server Page or Active Server Page. If the document does not have dynamic portions then the document is obtained from the cache for printing (act 310), and printed (act 314). However, if the document does have dynamic portions, then the static portion(s) of the document are obtained from the cache and the dynamic portion(s) are obtained from a remote source for printing (act 312), and printed (act 314).

Figure 7:
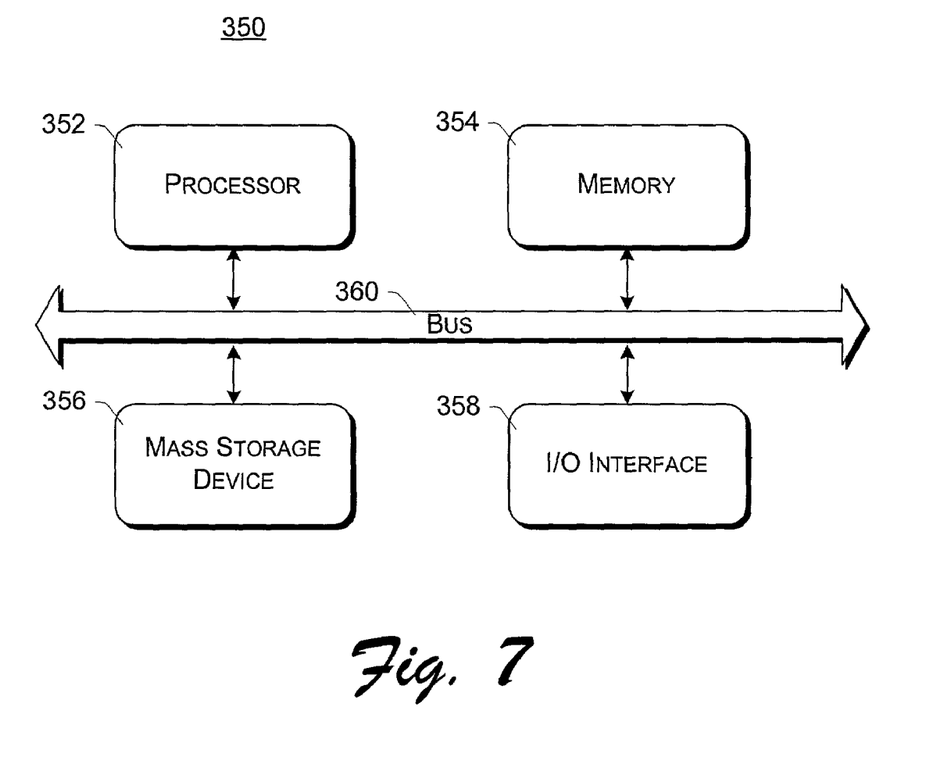
FIG. 7 illustrates an exemplary computer in additional detail.

FIG. 7 illustrates an exemplary computer 350 in additional detail. Computer 350 can be, for example, a client 102 or server 104 or 106 of FIG. 1. Computer 350 represents a wide variety of computing devices, such as desktop computers, portable computers, dedicated server computers, multi-processor computing devices, personal digital assistants (PDAs), handheld or pen-based computers, microcontroller-based electronic devices, and so forth.

Computer 350 includes a processor 352, a memory 354, a mass storage device 356, and an input/output (I/O) interface 358, all coupled via a bus 360. Bus 360 represents one or more buses in computer system 350, such as a system bus, processor bus, Accelerated Graphics Port (AGP), Peripheral Component Interconnect (PCI), Universal Serial Bus (USB), and so forth. The bus architecture can vary by computing device as well as by manufacturer. I/O interface 358 is one or more conventional interfaces allowing components of computer 350 (e.g., processor 352) to communicate with other computing devices via a network, receive inputs from a user, and present outputs to a user. I/O interface 358 may include, for example, one or more of a modem, a network interface card (NIC), a keyboard, a cursor control device (e.g., a mouse, a touchpad, a trackball, etc.), a display device, speakers, a microphone, and so forth.

Memory 354 represents volatile and/or nonvolatile memory used to store instructions and data for use by processor 352. Typically, instructions are stored on a mass storage device 356 (or nonvolatile memory) and loaded into a volatile memory 354 for execution by processor 352. Additional memory components may also be involved, such as cache memories internal or external to processor 352. Various embodiments of the invention may be implemented, at different times, in any of a variety of computer readable media that is part of, or readable by, computer 350. For example, such computer readable media may be mass storage device 356, memory 354 or a cache memory, a removable disk (not shown) that is accessible by processor 352 or another controller of computer 350 (such as a magnetic disk or optical disk), and so forth.

Computer 350 is exemplary only. It is to be appreciated that additional components (not shown) can be included in computer 350 and some components illustrated in computer 350 need not be included. For example, additional processors or storage devices, additional I/O interfaces, and so forth may be included in computer 350, or mass storage device 356 may not be included.

The discussions herein refer primarily to software components and modules that can be executed by a computing device. It is to be appreciated, however, that the components and processes described herein can be implemented in software, firmware, hardware, or a combination thereof. By way of example, a Programmable Logic Device (PLD) or Application Specific Integrated Circuit (ASIC) could be configured or designed to implement various components and/or processes discussed herein.

The discussions herein refer to printing processes in which a print substance (such as ink or toner) is applied to a print medium (such as paper). Alternatively, other printing processes may be used that print data in a manner other than applying a print substance to a print medium, such as the application of heat to heat-sensitive print media (e.g., in a thermal printer), the application of light to light-sensitive media, changing of electrical charge (e.g. e-paper) etc.

The discussions above also make reference to modules of a printer making data available to another module. Data can be made available in any of a wide variety of manners, such as sending a data structure that includes the data to another module (e.g., passing the module as a parameter when invoking a process or procedure of the module), sending an indication to another module of where the web page data is located (e.g., a pointer to the data in the printer's memory), sending an indication that the web page is available at some predetermined location (such as a particular address in the printer's memory), and so on.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
receiving, at a printing device from a client computer, a network address of a web page accessed by the client computer;
retrieving, by the printing device, the web page at the network address;
converting, by the printing device, the web page into a print-ready format prior to the printing device receiving any request to print the web page;
storing, in the printing device, a timestamp indicating a last time the web page was modified; and
upon receiving a request to print the web page, using the timestamp to determine whether the web page has been modified since the web page was converted into the print-ready format.

2. A method as recited in claim 1 further comprising:
saving in the printing device the web page in the print-ready format as hardware-ready bits;
receiving, at the printing device from the client computer, a request to print the web page;
supplying the hardware-ready bits to a print engine in the printing device to print the web page.

3. A method as recited in ciaim 1 further comprising, using a browsing module in the printing device to retrieve the web page.

4. A method as recited in claim 1, wherein the web page is rendered, ripped, and then stored in the print-ready format in the printing device to expedite printing of the web page upon receiving a request from the client computer to print the web page.

5. A method comprising:
receiving, at a printing device from a client computer, a network address of a web page accessed by the client computer;
retrieving, by the printing device, the web page at the network address; and
converting, by the printing device, the web page into a print-ready format prior to the printing device receiving any request to print the web page, wherein the web page is converted in the print-ready format during a time when the printing device is not printing to avoid affecting a speed at which web pages are printed for which print-ready files do not exist.

6. A method, implemented in a printing device, the method comprising:
receiving, from a computing device, an indication of a network document, wherein the indication is received at the printing device prior to the printing device receiving any requests to print the network document;

using the indication of the network document to retrieve the network document over a network from a document source;

converting the network document into a print-ready format of hardware-ready bits that are supplied to a print engine in the printing device to print the network document prior to the printing device receiving any requests to print the network document;

saving the converted network document;

receiving, from the computing device, the request to print the network document;

printing, using the saved converted network document, the network document in response to the request;

receiving, from another computing device, another request to print the network document; and printing the network document in response to the other request using the saved converted network document.

7. A method as recited in claim 6, wherein receiving the request to print the network document comprises:

receiving, from the computing device, the request to print the network document after the converted network document is saved.

8. A method as recited in claim 6, wherein saving the converted network document comprises:

saving the converted network document locally at the printing device.

9. A method as recited in claim 6, further comprising:

checking, upon receipt of the indication of the network document, a cache of print-ready documents to determine whether a print-ready document corresponding to the network document is already in the cache;

if a print-ready document corresponding to the network document is already in the cache, then checking whether the print-ready document is outdated; and bypassing the retrieving, converting, and saving if both a print-ready document corresponding to the network document is already in the cache and the print-ready document corresponding to the network document is not outdated.

10. A method, implemented in a printing device, the method comprising:

receiving, from a computing device, an indication of a network document, wherein the indication is received at the printing device prior to the printing device receiving any requests to print the network document;

using the indication of the network document to retrieve the network document over a network from a document source;

converting the network document into a print-ready format of hardware-ready bits that are supplied to a print engine in the printing device to print the network document prior to the printing device receiving any requests to print the network document;

saving the converted network document;

receiving, from the computing device, the request to print the network document;

printing, using the saved converted network document the network document in response to the request;

maintaining a record of each received indication;

receiving a request to print a set of network documents accessed by the computing device; and printing, in response to the request to print the set of network documents accessed by the computing device, the record.

11. A method as recited in claim 10, further comprising:

maintaining a timestamnp corresponding to each received indication, the timestamp indicating an approximate time the network document was accessed the computing device; and printing, as part of the record, the timestamp corresponding to each received indication.

12. A printer comprising:

an interface configured to transmit and receive data via a network;

a browsing module configured to receive, via the interface from a remote computing device, an indication of a web page being accessed by the remote computing device prior to any request that the web page be printed, and further configured to use the indication to retrieve the web page over a network from a remote source;

one or more additional modules configured to receive the retrieved web page from the browsing module, to convert the web page into a print-ready document, and to store the print-ready document; and a print engine configured to receive, via the interface from the remote computing device, a request to print the web page, wherein the request to print the web page is independent of the indication of the web page being accessed, and wherein the print engine is further configured to print the web page by printing the print-ready document, wherein the pre-rendered format comprises a Printer Control Language (PCL) format;

wherein the one or more additionai modules comprises:

a pre-rendering engine configured to convert the received web page into a pre-rendered format; and a pre-ripping engine configured to convert the web page in pre-rendered format into a set of hardware-ready bits.

13. A printer as recited in claim 12, wherein the remote source comprises a web server hosting the web page.

14. A printer as recited in claim 12, wherein the indication is a network address of the web page.

15. A printer as recited in claim 12, wherein the printer uses a timestamp indicating when the web page was last modified to check whether the web page has been modified since the print-ready document was saved in the printer.

16. A printer comprising:

an interface configured to transmit and receive data via a network;

a browsing module configured to receive, via the interface from a remote computing device, an indication of a web page being accessed by the remote computing device prior to any request that the web page be printed, and further configured to use the indication to retrieve the web page over a network from a remote source;

one or more additional modules configured to receive the retrieved web page from the browsing module, to convert the web page into a print-ready document, and to store the print-ready document; and a print engine configured to receive, via the interface from the remote computing device, a request to print the web page, wherein the request to print the web page is independent of the indication of the web page being accessed, and wherein the print engine is further configured to print the web page by printing the print-ready document, wherein the pre-rendered format comprises a PostScript format;

wherein the one or more additional modules comprises:

a pre-rendering engine configured to convert the received web page into a pre-rendered format; and a pre-ripping engine configured to convert the web page in pre-rendered format into a set of hardware-ready bits.

17. A method, implemented in a printing device, the method comprising:
- receiving, from one or more computing devices, indications of a plurality of network documents, wherein the indications are received at the printing device prior to the printing device receiving any and all requests to print the network documents;
- using the indications to retrieve the network documents over a network from one or more document sources prior to the printing device receiving requests to print the network documents;
- maintaining a cache of the plurality of network documents;
- receiving a request to print particular network document;
- checking whether the particular network document is one of the plurality of network documents present in the cache; and
- if the particular network document is present in the cache, then obtaining the particular network document from the cache for printing, and otherwise obtaining the particular network document from a remote source for printing.

18. A method as recited in claim 17, wherein maintaining the cache of the plurality of network documents comprises maintaining the cache of the plurality of network documents in a print-ready format.

19. A method as recited in claim 17 wherein the particular network document comprises a web page and wherein the remote source comprises a web server hosting the web page.

20. A method as recited in claim 17, wherein the particular network document includes both a static portion and a dynamic portion, and further comprising obtaining the static portion from the cache for printing and obtaining the dynamic portion from the remote source for printing.

21. A method as recited in claim 17, wherein maintaining the cache of the plurality of network documents comprises maintaining the cache of the plurality of network documents locally at the printing device.

22. A method as recited in claim 17, further comprising including in the cache a set of network documents that are determined to be most frequently printed by the printing device.

23. One or more computer readable media having stored thereon a plurality of instructions that, when executed by a computing device in the form of a printing device, causes the printing device to perform acts comprising:
- receiving, from one or more computing devices, network addresses of a plurality of web pages, wherein the network addresses are received at the printing device prior to the printing device receiving any and all requests to print the web pages;
- using the network addresses to retrieve the web pages over a network from one or more document sources prior to the printing device receiving any requests to print the web pages;
- maintaining a cache of the plurality of web pages;
- receiving a request to print a particular web page;
- checking the cache maintained by the printing device to determine whether the web page is present in the cache;
- if the web page is present in the cache, then retrieving the web page from the cache for printing, and otherwise obtaining the network document from a remote source for printing.

24. One or more computer readable media as recited in claim 23, wherein the cache comprises a cache of web pages in print-ready format.

* * * * *

UNITED STATES PATENT AND TRADEMARK OFFICE
CERTIFICATE OF CORRECTION

PATENT NO. : 7,535,583 B2 Page 1 of 1
APPLICATION NO. : 10/008073
DATED : May 19, 2009
INVENTOR(S) : Robert Sesek et al.

It is certified that error appears in the above-identified patent and that said Letters Patent is hereby corrected as shown below:

In column 14, line 43, in Claim 3, delete "ciaim" and insert -- claim --, therefor.

In column 15, line 60, in Claim 10, delete "document" and insert -- document, --, therefor.

In column 16, line 2, in Claim 11, delete "timestamnp" and insert -- timestamp --, therefor.

In column 16, line 4, in Claim 11, after "accessed" insert -- by --.

In column 16, line 29, in Claim 12, delete "additionai" and insert -- additional --, therefor.

In column 17, line 14, in Claim 17, after "print" insert -- a --.

In column 18, line 7, in Claim 22, delete "detennined" and insert -- determined --, therefor.

Signed and Sealed this

Twenty-fourth Day of August, 2010

David J. Kappos
*Director of the United States Patent and Trademark Office*